United States Patent
Chen et al.

(10) Patent No.: US 10,805,946 B2
(45) Date of Patent: Oct. 13, 2020

(54) UPLINK DATA TRANSMISSION METHOD AND DEVICE

(71) Applicant: CHINA ACADEMY OF TELECOMMUNICATIONS TECHNOLOGY, Beijing (CN)

(72) Inventors: Li Chen, Beijing (CN); Haiyang Quan, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 16/300,535

(22) PCT Filed: May 11, 2017

(86) PCT No.: PCT/CN2017/083849
§ 371 (c)(1),
(2) Date: Nov. 9, 2018

(87) PCT Pub. No.: WO2017/193945
PCT Pub. Date: Nov. 16, 2017

(65) Prior Publication Data
US 2019/0150177 A1    May 16, 2019

(30) Foreign Application Priority Data
May 12, 2016 (CN) .......................... 2016 1 0317806

(51) Int. Cl.
*H04W 72/12* (2009.01)
*H04W 74/08* (2009.01)
*H04L 1/18* (2006.01)

(52) U.S. Cl.
CPC ....... *H04W 72/1268* (2013.01); *H04L 1/1812* (2013.01); *H04W 72/12* (2013.01); *H04W 72/1284* (2013.01); *H04W 74/08* (2013.01)

(58) Field of Classification Search
None
See application file for complete search history.

(56) References Cited

U.S. PATENT DOCUMENTS

| 2013/0163535 A1 | 6/2013 | Anderson et al. |
| 2013/0163536 A1* | 6/2013 | Anderson ......... H04W 72/1284 370/329 |

(Continued)

FOREIGN PATENT DOCUMENTS

| CN | 101378590 A | 3/2009 |
| CN | 103763748 A | 4/2014 |

(Continued)

OTHER PUBLICATIONS

Extended European Search Report from EP app. No. 17795563.0, dated Mar. 11, 2019.

(Continued)

*Primary Examiner* — Yaotang Wang
(74) *Attorney, Agent, or Firm* — Ladas & Parry, LLP

(57) ABSTRACT

A method and a device for transmitting uplink data are provided. The method includes sending, by a UE, an initial uplink transmission carrying an inactive-state UE identifier of the UE in uplink contention resources available in a region, in case that uplink data of the UE in an inactive state arrives; and receiving a feedback acknowledgement message for acknowledging the initial uplink transmission.

12 Claims, 5 Drawing Sheets

(56) References Cited

U.S. PATENT DOCUMENTS

| | | |
|---|---|---|
| 2015/0358102 A1 | 12/2015 | Ko |
| 2016/0105829 A1* | 4/2016 | Wentink |
| 2017/0215201 A1* | 7/2017 | Kim .................. H04L 27/26 |
| 2019/0059119 A1* | 2/2019 | Hapsari ............. H04W 76/10 |

FOREIGN PATENT DOCUMENTS

| | | |
|---|---|---|
| CN | 104137573 A | 11/2014 |
| CN | 104160772 A | 11/2014 |
| CN | 104684101 A | 6/2015 |
| WO | 2010048563 A1 | 4/2010 |
| WO | 2014116019 A1 | 7/2014 |

OTHER PUBLICATIONS

Written Opinion of the International Searching Authority for PCT/CN2017/083849, dated Jul. 13, 2017, with English translation provided by WIPO.
International Preliminary Report on Patentability for PCT/CN2017/083849, dated Nov. 13, 2018, with English translation provided by WIPO.
International Search Report for PCT/CN2017/083849 dated Jul. 13, 2017 and its English translation provided by WIPO.
Written Opinion of the International Search Authority PCT/CN2017/083849 dated Jul. 13, 2017 and its English translation provided by Google Translate.
Huawei et al., "UL Scheduling Remaining Issues", R2-163224, May 4, 2016.

\* cited by examiner

UPLINK DATA TRANSMISSION METHOD AND DEVICE

CROSS-REFERENCE TO RELATED APPLICATIONS

The present application is the U.S. national phase of PCT Application No. PCT/CN2017/083849 filed on May 11, 2017, which claims a priority to Chinese application No. 201610317806.2 filed to National Intellectual Property Administration, PRC on May 12, 2016, the disclosures of which are incorporated herein by reference in their entireties.

TECHNICAL FIELD

The present disclosure relates to the field of communication technology, and in particular, relates to a uplink data transmission method and a uplink data transmission device.

BACKGROUND

In states of a User Equipment, except a RRC_connected state in which an air-interface transmission unique identifier C-RNTI is assigned for the User Equipment to directly send and receive data, the User Equipment needs to, in case that the User Equipment needs to transmit uplink data, initiate a connection establishment procedure, enter the RRC_connected state and establish a Radio Resource Control (RRC) connection, obtain the air-interface transmission unique identifier C-RNTI of the User Equipment for data transmission, before the User Equipment transmits the uplink data.

SUMMARY

In view of the above technical problem, a method for transmitting uplink data and a device for transmitting uplink data method are provided in the embodiments of the present disclosure. The technical problem that the UE is incapable of transmitting uplink data quickly in case that the UE is in an Inactive state is solved.

In a first aspect of the present disclosure, a method for transmitting uplink data is provided. The method for transmitting uplink data includes: sending, by a User Equipment (UE), an initial uplink transmission carrying an inactive-state UE identifier of the UE in uplink contention resources available in a region, in case that uplink data of the UE in an inactive state arrives; and receiving a feedback acknowledgement message for acknowledging the initial uplink transmission.

Optionally, the region at least includes a region in which the inactive-state UE identifier of the UE is valid. The uplink contention resources are grouped into one or more groups, configuration contents for each group of uplink contention resources include one or more of: time-domain resource positions and frequency-domain resource positions of the uplink contention resources, scrambled sequence codes used in scheduling and data transmission of the uplink contention resources, types of UEs to which the uplink contention resources are available, capability levels of UEs to which the uplink contention resources are applicable, and service types to which the uplink contention resources are applicable. The uplink contention resources is be configured by a system message broadcast, or per-configured by the UE, or configured by a dedicated signaling when the UE is in a connected state and before the UE enters the inactive state.

Optionally, contents of the initial uplink transmission include one or more of: the inactive-state UE identifier of the UE; an identifier indicating whether the UE is to enter a connected state; small data packets sent to an access device by the UE; and a Buffer Status Report (BSR), wherein contents of the BSR are an amount of cached data to be sent currently by the UE, or the BSR is empty.

Optionally, in case that the UE needs to enter a connected state, the feedback acknowledgement message carries the inactive-state UE identifier of the UE and/or an air-interface transmission unique identifier of the UE; and in case that the UE does not need to enter the connected state, the feedback acknowledgement message carries the inactive-state UE identifier of the UE.

Optionally, after sending the initial uplink transmission by the UE, the method further includes caching, by the UE, data packets having been sent in the initial uplink transmission. After receiving, by the UE, the feedback acknowledgement message for acknowledging the initial uplink transmission, the method further includes: in case that the UE correctly receives the feedback acknowledgement message from an access device, emptying the cached data packets by the UE; in case that the UE does not correctly receive the feedback acknowledgement message from the access device, continuing to send the cached data packets in subsequent uplink contention resources by the UE.

Optionally, the method further includes stopping attempting to send the cached data packets by the UE and informing high layers of the UE that data transmission is failed, in case that times that the UE attempts to send the cached data packets in the uplink contention resources reach a specified maximum attempt number, but the UE does not succeed.

Optionally, after receiving, by the UE, the feedback acknowledgement message sent by an access device for acknowledging the initial uplink transmission, the method further includes: sending an ACK feedback message by the UE in response to the feedback acknowledgement message sent by the access device, in case that the feedback acknowledgement message carries the inactive-state UE identifier of the UE, wherein Hybrid Automatic Repeat reQuest (HARQ) feedback resource positions related to the ACK feedback message correspond to resource positions of the feedback acknowledgement message sent by the access device, an ACK sequence related to the ACK feedback message is related to resources of the feedback acknowledgement message from the access device and/or an air-interface transmission unique identifier of the UE; or sending uplink transmission by the UE according to subsequent uplink scheduling in case that the feedback acknowledgement message carries the air-interface transmission unique identifier of the UE, wherein the subsequent uplink scheduling is performed by the access device for the UE according to the air-interface transmission unique identifier of the UE.

Optionally, the method further includes determining a traffic type of the uplink data by the UE, and not triggering the UE to enter a connected state in case that the traffic type of the uplink data is a traffic of burst small data packets, or triggering the UE to enter the connected state in case that the traffic type of the uplink data is a continuous traffic; or determining an amount of the uplink data needing to be sent by the UE, and not triggering the UE to enter the connected state in case that the amount of the uplink data is smaller than a predetermined threshold, or triggering the UE to enter the connected state in case that the amount of the uplink data is larger than the predetermined threshold.

In another aspect of the present disclosure, a method for transmitting uplink data is provided. The method includes receiving, by an access device, an initial uplink transmission carrying an inactive-state UE identifier of a User Equipment (UE), wherein the initial uplink transmission is sent by the UE in uplink contention resources available in a region in case that uplink data of the UE in an inactive state arrives; and sending, by the access device, a feedback acknowledgement message for acknowledging the initial uplink transmission.

Optionally, the region at least includes a region in which the inactive-state UE identifier of the UE is valid. The uplink contention resources are grouped into one or more groups, and configuration contents for each group of uplink contention resources include one or more of: time-domain resource positions and frequency-domain resource positions of the uplink contention resources, scrambled sequence codes used in scheduling and data transmission of the uplink contention resources, types of UEs to which the uplink contention resources are available, capability levels of UEs to which the uplink contention resources are applicable, and service types to which the uplink contention resources are applicable; and the uplink contention resources are configured by a system message broadcast, or preconfigured by the UE, or configured by a dedicated signaling of the access device when the UE is in a connected state and before the UE enters the inactive state.

Optionally, contents of the initial uplink transmission include one or more of: the inactive-state UE identifier of the UE, an identifier indicating whether the UE needs to enter a connected state, small data packets which the UE sends to the access device, and a Buffer Status Report (BSR), wherein contents of the BSR include an amount of cached data to be sent by the UE currently or the BSR is empty.

Optionally, in case that the UE needs to enter a connected state, the feedback acknowledgement message carries the inactive-state UE identifier of the UE and/or the air-interface transmission unique identifier of the UE; in case that the UE does not need to enter the connected state, the feedback acknowledgement message carries the inactive-state UE identifier of the UE.

Optionally, after sending, by the access device, the feedback acknowledgement message for acknowledging the initial uplink transmission, the method further includes: receiving, by the access device, an ACK feedback message sent by the UE in response to the feedback acknowledgement message, in case that the feedback acknowledgement message carries the inactive-state UE identifier of the UE, wherein Hybrid Automatic Repeat reQuest (HARQ) feedback resource positions related to the ACK feedback message correspond to resource positions of the feedback acknowledgement message sent by the access device, an ACK sequence related to the ACK feedback message is related to resources of the feedback acknowledgement message from the access device and/or an air-interface transmission unique identifier of the UE; or scheduling, by the access device, uplink transmission of the UE according to the air-interface transmission unique identifier of the UE in case that the feedback acknowledgement message carries the air-interface transmission unique identifier of the UE.

Optionally, the method further includes determining, by the access device, whether the UE needs to enter the connected state; determining that the UE needs to enter the connected state, in case that the initial uplink transmission received by the access device includes an identifier identifying that the UE is to enter the connected state and the identifier indicates that the UE needs to enter the connected state; or determining that the UE needs to enter the connected state, in case that the initial uplink transmission received by the access device includes a Buffer Status Report (BSR) indicating an amount of cached data to be sent by the UE and the amount of cached data is not zero.

In still another aspect of the present disclosure, a User Equipment (UE) is provided. The UE includes a sending module configured to, in case that uplink data of the UE in an inactive state arrives, send an initial uplink transmission carrying an inactive-state UE identifier of the UE in uplink contention resources available in a region; a reception module configured to receive a feedback acknowledgement message for acknowledging the initial uplink transmission.

Optionally, the region at least includes a region in which the inactive-state UE identifier of the UE is valid. Configuration contents for each group of uplink contention resources include one or more of: time-domain resource positions and frequency-domain resource positions of the uplink contention resources, scrambled sequence codes used in scheduling and data transmission of the uplink contention resources, types of UEs to which the uplink contention resources are available, capability levels of UEs to which the uplink contention resources are applicable, and service types to which the uplink contention resources are applicable. The uplink contention resources are be configured by a system message broadcast, or per-configured by the UE, or configured by a dedicated signaling when the UE is in a connected state and before the UE enters the inactive state.

Optionally, contents of the initial uplink transmission include one or more of: the inactive-state UE identifier of the UE, an identifier indicating whether the UE is to enter a connected state; small data packets sent to an access device by the UE; a Buffer Status Report (BSR), wherein contents of the BSR is an amount of cached data to be sent currently by the UE, or the BSR is empty.

Optionally, in case that the UE needs to enter a connected state, the feedback acknowledgement message carries the inactive-state UE identifier and/or an air-interface transmission unique identifier of the UE; in case that the UE does not need to enter the connected state, the feedback acknowledgement message carries the inactive-state UE identifier of the UE.

Optionally, the UE further includes a caching module configured to, after the UE sends the initial uplink transmission, cache data packets having been sent in the initial uplink transmission; an emptying module configured to, in case that the UE correctly receives the feedback acknowledgement message from the access device, empty the cached data packets. The sending module is further configured to, in case that the UE does not correctly receive the feedback acknowledgement message from the access device, continue to send the cached data packets in subsequent uplink contention resources.

Optionally, the UE further includes an informing module configured to, in case that times that the UE attempts to send the cached data packets in the uplink contention resources reach a specified maximum attempt number, but the UE does not succeed, stop attempting to send the cached data packets, and inform high layers of the UE that data transmission is failed.

Optionally, the UE further includes a feedback module configured to, in case that the feedback acknowledgement message carries the inactive-state UE identifier of the UE, send an ACK feedback message in response to the feedback acknowledgement message from the access device; wherein Hybrid Automatic Repeat reQuest (HARQ) feedback resource positions related to the ACK feedback message correspond to resource positions of the feedback acknowledgement message sent by the access device, an ACK sequence related to the ACK feedback message is related to resources of the feedback acknowledgement message from the access device and/or an air-interface transmission unique identifier of the UE; or the sending module is further configured to, in case that the feedback acknowledgement message carries the air-interface transmission unique identifier of the UE, send the uplink transmission according to subsequent uplink scheduling, wherein the subsequent uplink scheduling is performed by the access device for the UE according to the air-interface transmission unique identifier of the UE.

Optionally, the UE further includes a determination module, wherein the determination module is configured to determine a traffic type of the uplink data; and not trigger the UE to enter a connected state in case that the traffic type of the uplink data is a traffic of burst small data packets, or trigger the UE to enter the connected state in case that the traffic type of the uplink data is a continuous traffic; or the determination module is configured to determine an amount of the uplink data needing to be sent; not trigger the UE to enter the connected state in case that the amount of the uplink data is smaller than a predetermined threshold, or trigger the UE to enter the connected state in case that the amount of the uplink data is larger than the predetermined threshold.

In yet still another aspect of the present disclosure, an access device is provided. The access device includes a reception module configured to, receive an initial uplink transmission carrying an inactive-state UE identifier of a User Equipment (UE), wherein the initial uplink transmission is sent by the UE in uplink contention resources available in a region in case that uplink data of the UE in an inactive state arrives; a sending module configured to send a feedback acknowledgement message for acknowledging the initial uplink transmission.

Optionally, the region at least includes a region in which the inactive-state UE identifier of the UE is valid; the uplink contention resources are grouped into one or more groups, and configuration contents for each group of uplink contention resources include one or more of: time-domain resource positions and frequency-domain resource positions of the uplink contention resources, scrambled sequence codes used in scheduling and data transmission of the uplink contention resources, types of UEs to which the uplink contention resources are available, capability levels of UEs to which the uplink contention resources are applicable, and service types to which the uplink contention resources are applicable; and the uplink contention resources are configured by a system message broadcast, or preconfigured by the UE, or configured by a dedicated signaling of the access device when the UE is in a connected state and before the UE enters the inactive state.

Optionally, contents of the initial uplink transmission include one or more of: the inactive-state UE identifier of the UE, an identifier indicating whether the UE needs to enter a connected state, small data packets which the UE sends to the access device, and a Buffer Status Report (BSR), wherein contents of the BSR include an amount of cached data to be sent by the UE currently or the BSR is empty.

Optionally, in case that the UE needs to enter a connected state, the feedback acknowledgement message carries the inactive-state UE identifier of the UE and/or an air-interface transmission unique identifier of the UE; in case that the UE does not need to enter the connected state, the feedback acknowledgement message carries the inactive-state UE identifier of the UE.

Optionally, the reception module is further configured to, in case that the feedback acknowledgement message carries the inactive-state UE identifier of the UE, receive an ACK feedback message sent by the UE in response to the feedback acknowledgement message; wherein Hybrid Automatic Repeat reQuest (HARQ) feedback resource positions related to the ACK feedback message correspond to resource positions of the feedback acknowledgement message sent by the access device, an ACK sequence related to the ACK feedback message is related to resources of the feedback acknowledgement message from the access device and/or an air-interface transmission unique identifier of the UE; or the access device further includes a scheduling module configured to, in case that the feedback acknowledgement message carries the air-interface transmission unique identifier of the UE, schedule uplink transmission of the UE according to the air-interface transmission unique identifier of the UE.

Optionally, the access device further includes a determination module, wherein the determination module is configured to determine whether the UE needs to enter the connected state; determine that the UE needs to enter the connected state in case that the initial uplink transmission received by the reception module includes an identifier identifying that the UE is to enter the connected state and the identifier indicates the UE needs to enter the connected state; or the determination module is configured to determine that the UE needs to enter the connected state in case that the initial uplink transmission received by the reception module includes a Buffer Status Report (BSR) indicating an amount of cached data to be sent by the UE and the amount of cached data is not zero.

In still another aspect of the present disclosure, a UE is provided. The UE includes a processor, a storage and a transceiver, wherein the storage is configured to store programs and data used by the processor when the processor performs operations; the processor is configured to control the transceiver to transmit and receive data. The transceiver is configured to: send, under a control of the processor, an initial uplink transmission carrying an inactive-state UE identifier of the UE in uplink contention resources available in a region in case that uplink data of the UE in an inactive state arrives; and receive a feedback acknowledgement message for acknowledging the initial uplink transmission.

In still another aspect of the present disclosure, an access device is provided. The access device includes a processor, a storage and a transceiver, wherein the storage is configured to store programs and data used by the processor when the processor performs operations; the processor is configured to control the transceiver to receive and transmit data; the transceiver is configured to receive, under a control of the processor, an initial uplink transmission carrying an inactive-state UE identifier of a UE, wherein the initial uplink transmission is sent by the UE in uplink contention resources available in a region in case that uplink data of the UE in an inactive state arrives; and send a feedback acknowledgement message for acknowledging the initial uplink transmission.

At least one of the above technical solutions of the present disclosure is advantageous and has a beneficial effect in the following: in case that uplink data of a UE in an Inactive state arrives, the UE sends an initial uplink transmission carrying an inactive-state UE identifier of the UE in uplink contention resources available in a region, the UE receives a feedback acknowledgement message for acknowledging the initial uplink transmission. A solution in which the UE in the Inactive state performs the uplink data transmission quickly is provided, and because the UE in the Inactive state may send the small data packets to the access device, signaling overhead generated by state transitions of the UE is avoided, and whether the UE needs the state transitions may be determined flexibly, thus further reducing unnecessary signaling overhead.

DETAILED DESCRIPTION

Figure 1:
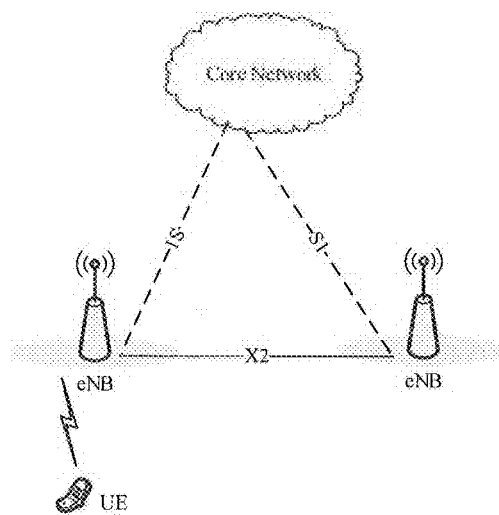
FIG. 1 is a diagram of a network arrangement structure of an exemplary application scene according to some embodiments of the present disclosure.

Exemplary embodiments of the present disclosure will be described in details hereinafter in conjunction with drawings. Although the exemplary embodiments of the present disclosure are shown in the drawings, it should be understood that the present disclosure may be implemented in various ways and is not limited by the embodiments described herein. On the contrary, these embodiments are provided to understand the present disclosure more thoroughly, and convey the scope of the present disclosure to one of ordinary skills in the art completely.

It is known for one skilled in the art that the embodiments of the present disclosure may be implemented as a system, a device, an apparatus, a method or a computer program product. Therefore, the embodiments of the present disclosure may be embodied as the following forms: complete hardware, complete software (including firmware, resident software, microcode, or the like), or a combination of hardware and software.

According to some embodiments of the present disclosure, a uplink data transmission method and a uplink data transmission device are provided. The embodiments of the present disclosure may be used in different network arrangement structures. For purpose of description, two network arrangement structures possibly be used in a mobile communication system are described.

With development of the mobile communication system, types of user equipment and types of services are getting more and more, demands for a User Equipment (UE) to save power, save network resources and satisfy various types of services exist concurrently. In order to enable the UE to save power and to perform fast data transmission, an inactive connected state, i.e., an Inactive state, of the UE is introduced. In such a state, the UE keeps a connection with a Core Network (CN) but does not perform common operations as performed in a connected state (such as handover, uplink periodic update, wireless link monitoring, or the like) at an air interface, an identifier for air-interface transmission is not directly assigned for the UE. Therefore, scheduling and transmission at the air interface cannot be directly performed.

In the states of a UE, except the RRC_connected state in which the air-interface transmission unique identifier C-RNTI is assigned for the UE to directly send and receive data, the UE needs to, if the UE needs to transmit uplink data, initiate a connection establishment procedure, enter the RRC_connected state and establish a Radio Resource Control (RRC) connection, obtain the air-interface transmission unique identifier C-RNTI of the UE for data transmission before the UE transmits the uplink data. This procedure does not facilitate fast transmission in case that uplink data arrives, and in case that burst small data packets need to be transmitted only, such as in a typical Machine Type Communication (MTC) service in which the UE enters the connected state, transmits a small data packet and then enters an idle state or an Inactive state for purpose of saving power, state transitions may bring signaling overhead which may be unacceptable if a quantity of UEs is massive, such as in a massive MTC (mMTC) scene.

Based on the above, a basic design concept of the present disclosure is as follows. In case that uplink data of a UE having not established a connection with a single cell arrives, an initial uplink transmission carrying an Inactive UE ID of the UE is sent in uplink contention resources available in the cell, and a base station sends an feedback acknowledgement message for acknowledging the uplink transmission from the UE.

The UE having not established a connection with a single cell specifically means that a new state of the UE, i.e., an inactive connected state (Inactive state) is introduced. In this state of the UE, following operations are permitted: the UE is determined to be in the connected state through the Core Network (CN); mobility is performed by the UE, and in a region pre-configured by the network side, the mobility is performed through a cell reselection procedure, not through a handover procedure; the UE is assigned with a unique user identifier in the region pre-configured by the network side, the region pre-configured includes a plurality of cells belonging to one or more base stations so as to increase a freedom degree of mobility when simplifying the mobility of the UE.

In the Inactive state, the network side assigns a Radio Access Network (RAN) identifier valid in a certain region for the UE. The identifier is used to identify the UE in the Inactive state, and may be used to find the UE by the network side or may be used as an identity identifier by the UE for entering the connected state when the UE actively initiates an uplink access procedure. The identifier may be named as an Inactive UE ID, or a resume UE ID. The identifier is different from the IMSI (International Mobile Subscriber Identification Number) that is unique globally or the C-RNTI (Cell Radio Network Temporary Identifier) of a UE in the connected state, and a length of the identifier is between lengths of the IMSI and the C-RNTI (for example, the length of the Inactive UE ID is 40 bits, the length of the C-RNTI is 16 bits), the identifier is valid only in the certain region including the plurality of cells or a plurality of eNBs. If the UE is located outside the region, the UE needs to update the Inactive UE ID.

Referring to FIG. 1, FIG. 1 schematically shows a diagram of a network arrangement structure of an exemplary application scene according to some embodiments of the present disclosure. The network arrangement structure is a typical Long Term Evolution (LTE) architecture. The network arrangement structure includes base stations (eNBs) and User Equipments (UEs). The eNBs have a plurality of cells. The UEs in the connected state perform air-interface data transmission and data reception with the cells, and is assigned with the unique identifier C-RNTI in the cells.

Figure 2:
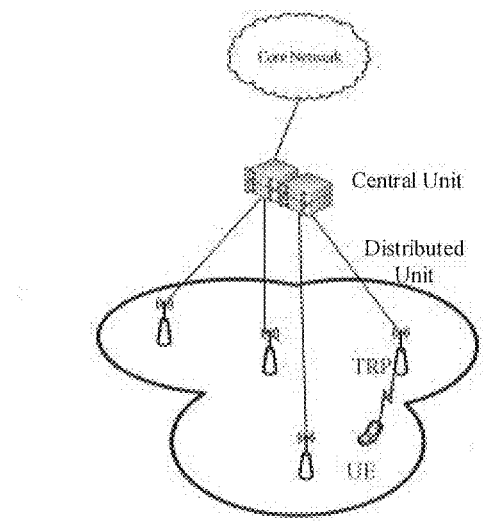
FIG. 2 is a diagram of another network arrangement structure of an exemplary application scene according to some embodiments of the present disclosure.

Referring to FIG. 2, FIG. 2 schematically shows a diagram of another network arrangement structure of an exemplary application scene according to some embodiments of the present disclosure. Nodes at the network side include a central unit (CU) and a plurality of distributed units (DUs), and a node at a user side is the UE.

FIG. 2 shows an architecture possibly used in a fifth generation (5G) mobile communication system. The nodes at the network side include the central unit and the distributed units. The central unit controls a plurality of distributed units deployed in a certain region. The distributed units perform air-interface transmission with the UE through transmission-reception points (TRPs). One or more of the transmission-reception points may serve the UE simultaneously, and perform data transmission. In every transmission mode being utilized, the network side assigns an air-interface transmission unique identifier for the UE to perform data scheduling and data transmission. The identifier may be the C-RNTI (Cell Radio Network Temporary Identifier) or a TRP-RNTI.

It should be noted that the embodiments of the present disclosure may be applied to the above two RAN structures. For sake of description, the unique identifier of a UE in the connected state is named as an air-interface transmission unique identifier of the UE hereinafter. The air-interface transmission unique identifier, if appears in a traditional LTE network, is the C-RNTI. A unique identifier of the UE in the Inactive state in a region is named as an Inactive UE ID. Nodes performing wireless signaling and data transmission and reception at the network side, whether the eNBs in FIG. 1 or the CU/DU (specifically, nodes performing data transmission and data reception are the TRPs) in FIG. 2, are all called access devices.

A uplink data transmission method according to some embodiments of the present disclosure is described hereinafter in combination with scenes shown in FIG. 1 or FIG. 2. It should be noted that the scenes are shown for purpose of understanding spirits and principles of the present disclosure, the embodiments of the present disclosure are not limited thereto. On the contrary, the embodiments of the present disclosure may be applied to any suitable scene.

Figure 3:
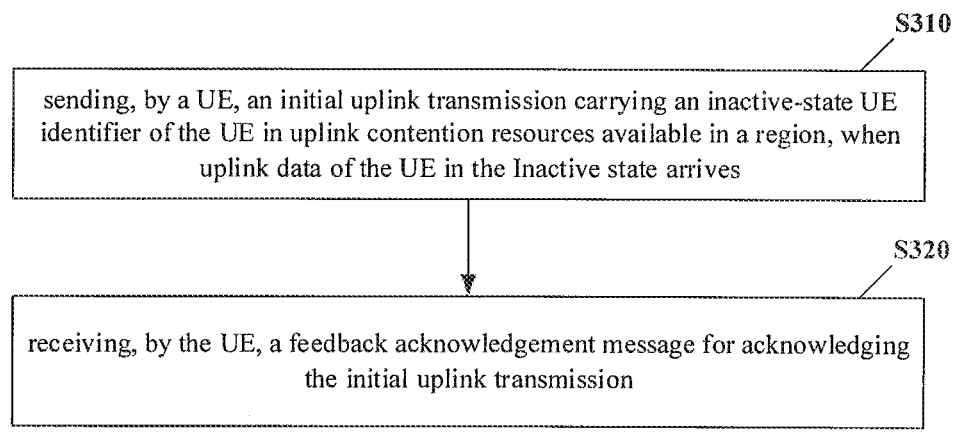
FIG. 3 is a schematic diagram of an uplink data transmission method according to some embodiments of the present disclosure.

FIG. 3 schematically shows a flowchart of an example of a uplink data transmission method according to some embodiments of the present disclosure. The method may be executed by a UE.

Step S310, in case that uplink data of the UE in the Inactive state arrives, sending, by the UE, initial uplink transmission carrying an inactive-state UE identifier of the UE in uplink contention resources available in a region.

The uplink contention resources available in the region refer to resources reserved for uplink contention transmission by all access devices in the region. The region at least includes a region in which the inactive-state UE identifier (such as the Inactive UE ID) of the UE is valid, and may include a larger region.

The uplink contention resources may be available by all UEs, or may be available by a specific type of UEs, or UEs with a specific capability, or UEs transmitting a specific traffic, and the present disclosure is not limited thereto.

The uplink contention resources may be grouped into one or more groups, wherein configuration contents for each group of uplink contention resources include one or more of the following: time-domain resource positions and frequency-domain resource positions of the uplink contention resources, scrambled sequence codes used in scheduling and data transmission of the uplink contention resources; types of UEs to which the uplink contention resources are available; capability levels of the UEs to which the uplink contention resources are applicable; and service types to which the uplink contention resources are applicable.

The uplink contention resources may be configured by any of the following: configured by a system message broadcast, per-configured by a UE; and configured by a dedicated signaling when the UE is in the connected state and before the UE enters the Inactive state.

Contents of the initial uplink transmission include one or more of the following: an inactive-state UE identifier of a UE; an identifier for whether the UE needs to enter the connected state; small data packets which the UE sends to an access device; and a Buffer Status Report (BSR), wherein contents of the BSR include an amount of cached data to be sent by the UE currently or the BSR is empty.

Step S320, receiving, by the UE, a feedback acknowledgement message for acknowledging the initial uplink transmission.

If the UE needs to enter the connected state, the feedback acknowledgement message carries the inactive-state UE identifier of a UE and/or the air-interface transmission unique identifier of the UE. If the UE does not need to enter the connected state, the feedback acknowledgement message carries the inactive-state UE identifier of the UE.

Optionally, in the embodiments of the present disclosure, after the UE sends the initial uplink transmission, the method further includes: caching, by the UE, uplink data packets having been sent in the initial uplink transmission. Accordingly, after the Step S320 (receiving, by the UE, a feedback acknowledgement message for acknowledging the initial uplink transmission), the method further includes: in a case that the UE correctly receives the feedback acknowledgement message from the access device, emptying the cached data packets by the UE; and in a case that the UE does not correctly receive the feedback acknowledgement message from the access device, continuing to send, by the UE, the cached data packets in subsequent uplink contention resources.

Optionally, in the embodiments of the present disclosure, the method further includes: in case that times that the UE attempts to send the cached data packets in the uplink contention resources reach a specified maximum attempt number, but the UE still does not succeed, stopping, by the UE, attempting to send the cached data packets and informing highlayers of the UE that data transmission is failed.

Figure 4:
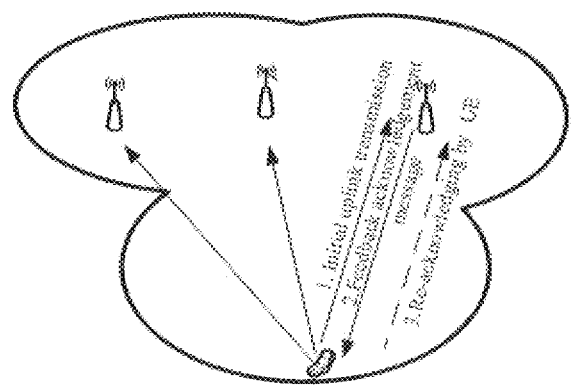
FIG. 4 is a flowchart of the method after an access device sends a feedback acknowledgement message according to some embodiments of the present disclosure.

Optionally, in the embodiments of the present disclosure, after the Step S320 (receiving, by the UE, a feedback acknowledgement message for acknowledging the initial uplink transmission), the method further includes: in case that the feedback acknowledgement message carries the inactive-state UE identifier of the UE, sending an ACK feedback message by the UE in response to the feedback acknowledgement message from the access device, referring to FIG. 4.

Hybrid Automatic Repeat reQuest (HARQ) feedback resource positions related to the ACK feedback message correspond to resource positions of the feedback acknowledgement message sent by the access device, an ACK sequence related to the ACK feedback message is related to resources of the feedback acknowledgement message from the access device and/or the air-interface transmission unique identifier of the UE; or in case that the feedback acknowledgement message carries the air-interface transmission unique identifier of the UE, the UE sends uplink transmission according to subsequent uplink scheduling, wherein the subsequent uplink scheduling refers to uplink scheduling for the UE performed by the access device according to the air-interface transmission unique identifier of the UE.

Optionally, in the embodiments of the present disclosure, the method further includes: determining a traffic type of the uplink data by the UE; if the traffic type of the uplink data is a traffic of burst small data packets, not triggering the UE to enter the connected state; if the traffic type of the uplink data is a continuous traffic, triggering the UE to enter the connected state; or the method further includes determining, by the UE, an amount of uplink data needing to be sent; if the amount of the uplink data is smaller than a predetermined threshold, not triggering the UE to enter the connected state; if the amount of the uplink data is larger than the predetermined threshold, triggering the UE to enter the connected state.

In the embodiments of the present disclosure, in case that uplink data of the UE in the Inactive state arrives, the UE sends the initial uplink transmission carrying the inactive-state UE identifier of the UE in the uplink contention resources available in the region, the UE receives the feedback acknowledgement message for acknowledging the initial uplink transmission. A solution in which the UE in the Inactive state performs the uplink data transmission quickly is provided, and because the UE in the Inactive state may send the small data packets to the access device, signaling overhead generated by state transitions of the UE is avoided, and whether the UE needs the state transitions may be determined flexibly, thus further reducing unnecessary signaling overhead.

A uplink data transmission method according to some embodiments of the present disclosure is described hereinafter by referring to FIG. 5 and in combination with the scenes shown in FIG. 1 or FIG. 2. It should be noted that the scenes are shown for purpose of understanding spirits and principles of the present disclosure, the embodiments of the present disclosure are not limited thereto. On the contrary, the embodiments of the present application may be applied to any suitable scene.

Figure 5:
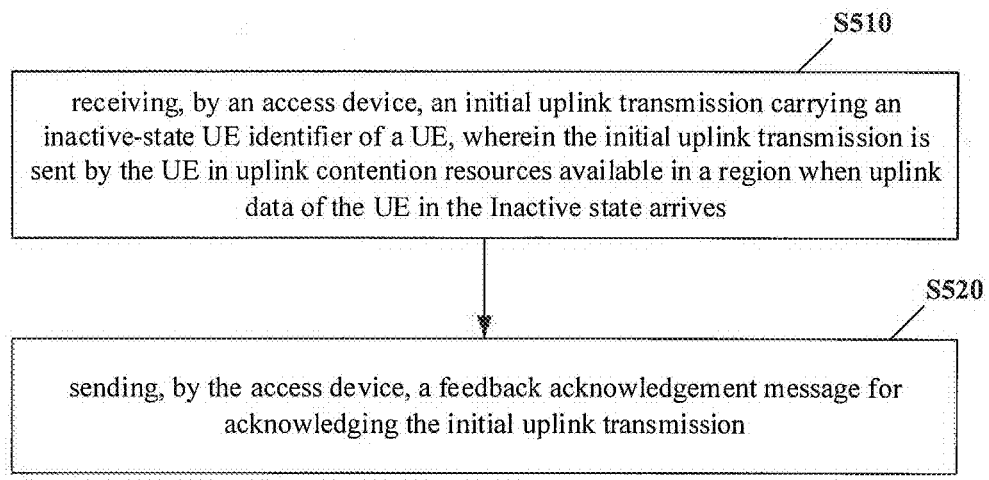
FIG. 5 is a schematic diagram of the uplink data transmission method according to some embodiments of the present disclosure.

FIG. 5 schematically shows a flowchart of an example of a uplink data transmission method according to some embodiments of the present disclosure. The method may be executed by an access device.

Step S510, receiving, by the access device, an initial uplink transmission carrying an inactive-state UE identifier of a UE, wherein the initial uplink transmission is sent by the UE in uplink contention resources available in a region in case that uplink data of the UE in the Inactive state arrives.

The uplink contention resources available in the region refer to resources reserved for uplink contention transmission by all access devices in the region. The region at least includes a region in which the inactive-state UE identifier (such as Inactive UE ID) of the UE is valid, and may include a larger region.

The uplink contention resources may be available by all UEs, and may be available by a specific type of UEs, or UEs with a specific capability, or UEs transmitting a specific traffic, and the present disclosure is not limited thereto.

The uplink contention resources may be grouped into one or more groups, wherein configuration contents for each group of uplink contention resources include one or more of the following: time-domain resource positions and frequency-domain resource positions of the uplink contention resources, scrambled sequence codes used in scheduling and data transmission and reception of the uplink contention resources; types of UEs to which the uplink contention resources are available; capability levels of the UEs to which the uplink contention resources are applicable; and service types to which the uplink contention resources are applicable.

The uplink contention resources may be configured by any of the following: configured by a system message broadcast, per-configured by a UE; and configured by a dedicated signaling when the UE is in the connected state and before the UE enters the Inactive state.

Contents of the initial uplink transmission include one or more of the following: an inactive-state UE identifier of a UE; an identifier for whether the UE needs to enter the connected state; small packets which the UE sends to an access device; and a Buffer Status Report (BSR), wherein contents of the BSR include an amount of cached data to be sent by the UE currently or the BSR is empty.

Step S520, sending, by the access device, a feedback acknowledgement message for acknowledging the initial uplink transmission.

If the UE needs to enter the connected state, the feedback acknowledgement message carries the inactive-state UE identifier of the UE and/or the air-interface transmission unique identifier of the UE; if the UE does not need to enter the connected state, the feedback acknowledgement message carries the inactive-state UE identifier of the UE.

Optionally, in the embodiments of the present disclosure, after the sending, by the access device, the feedback acknowledgement message for acknowledging the initial uplink transmission, the method further includes: in case that the feedback acknowledgement message carries the inactive-state UE identifier of the UE, receiving, by the access device, an ACK feedback message sent by the UE in response to the feedback acknowledgement message, wherein Hybrid Automatic Repeat reQuest (HARQ) feedback resource positions related to the ACK feedback message correspond to resource positions of the feedback acknowledgement message sent by the access device, an ACK sequence related to the ACK feedback message is related to resources of the feedback acknowledgement message from the access device and/or the air-interface transmission unique identifier of the UE; and/or in case that the feedback acknowledgement message carries the air-interface transmission unique identifier of the UE, scheduling, by the access device, uplink transmission of the UE according to the air-interface transmission unique identifier of the UE.

Optionally, in the embodiments of the present disclosure, the method further includes: determining, by the access device, whether the UE needs to enter the connected state; in case that the initial uplink transmission received by the access device includes an identifier identifying that the UE is to enter the connected state, and the identifier indicates that the UE needs to enter the connected state, determining, by the access device, that the UE needs to enter the connected state; or in case that the initial uplink transmission received by the access device includes a Buffer Status Report (BSR) which indicates an amount of cached data to be sent by the UE, and the amount of cached data is not zero, determining, by the access device, that the UE needs to enter the connected state.

In the embodiments of the present disclosure, in case that uplink data of the UE in the Inactive state arrives, the UE sends the initial uplink transmission carrying the inactive-state UE identifier of the UE in the uplink contention resources available in the region, the UE receives the feedback acknowledgement message for acknowledging the initial uplink transmission. A solution in which the UE in the Inactive state performs the uplink data transmission quickly. Furthermore, because the UE in the Inactive state may send the small data packets to the access device, signaling overhead generated by state transitions of the UE is avoided, and whether the UE needs the state transitions may be determined flexibly, thus further reducing unnecessary signaling overhead.

In the embodiments of the present disclosure, an applicable scene is that the UE sends small data packets each time. Specifically, the scene includes steps as follow.

First Step: sending, by the UE, the initial uplink transmission in uplink contention resources available in a region, wherein the initial uplink transmission includes: an inactive-state UE identifier of the UE for identifying an identity of the UE, such as the Inactive UE ID; an identifier, Ci, identifying whether the UE is to enter the connected state; and small data packets sent to the access device. The region is selectable. One design scheme is that the UE is determined to need to enter the connected state if the UE sends the Buffer Status Report (BSR), or the UE is determined to not need to enter the connected state if the UE sends complete small data packets without the BSR or with an empty BSR. In the embodiments of the present disclosure, the Ci indicates that the UE does not need to enter the connected state, or uplink transmission of the UE does not carry BSR or carries the empty BSR.

Second Step: sending, by the access device, the feedback acknowledgement message, the feedback acknowledgement message carrying the identifier of the UE in the Inactive state, such as the Inactive UE ID.

Third Step: sending the ACK feedback message by the UE in response to the feedback acknowledgement message from the access device. The HARQ feedback resource positions correspond to resource positions of the feedback acknowledgement message sent by the access device. The ACK sequence may be related to resources in which the feedback acknowledgement message is sent by the base station and/or the inactive-state UE identifier of the UE.

It should be noted that the third step is an optional step.

Further, after the UE sends the initial uplink transmission, the UE cached the data packets having been sent in a cache.

If the UE correctly receives the feedback acknowledgement message sent by the access device, the UE may empty the cache. If the UE fails to correctly receive the feedback acknowledgement message sent by the access device, the UE continues to send the data packets in subsequent uplink contention resources, and repeats the first to third steps. It may be further defined that if specified maximum times that the UE attempts to transmit the data packets in the uplink contention resources and the UE still does not succeed, the UE stops attempting and informs higher layers that a link is unreliable, and a correct transmission is impossible.

In the embodiments of the present disclosure, an applicable scene is that the UE needs to enter the connected state (indicated by the Ci). Specifically, the scene includes steps as follow.

First Step: sending the initial uplink transmission in uplink contention resources available in a region by the UE, wherein the initial uplink transmission includes: an inactive-state UE identifier of the UE for identifying an identity of the UE, such as the Inactive UE ID; the identifier, Ci, indicating whether the UE needs to enter the connected state, wherein the identifier may indicate the UE needs to enter the connected state; data packets and/or BSR report sent to the access device.

Second Step: sending, by the access device, the feedback acknowledgement message, wherein the feedback acknowledgement message carries the identifier of the UE in the Inactive state (such as the Inactive UE ID) for acknowledging to the UE and solving contention, and/or the air-interface transmission unique identifier of the UE. The air-interface transmission unique identifier is used for performing data scheduling and data transmission of the UE after the UE enters the connected state. After the UE receives the feedback acknowledgement message carrying the air-interface transmission unique identifier of the UE, the air-interface transmission unique identifier of the UE comes into effect and the UE enters the connected state.

Third Step: sending the ACK feedback message by the UE in response to the feedback acknowledgement message from the access device. Resource positions of Hybrid Automatic Repeat reQuest (HARQ) feedbacks correspond to resource positions of the feedback acknowledgement message sent by the access device. The ACK sequence may be related to resources in which the feedback acknowledgement message is sent by the access device and/or the air-interface transmission unique identifier of the UE. Optionally, the access device schedules uplink transmission of the UE using the air-interface transmission unique identifier of the UE. If the UE sends uplink transmission according to subsequent uplink scheduling, then UE finishes an acknowledge procedure simultaneously.

It should be noted that the third step is an optional step.

Further, after the UE sends the initial uplink transmission, the UE caches, in a cache, data packets having been sent.

If the UE correctly receives the feedback acknowledgement message sent by the access device, the UE may empty the cache. If the UE fails to correctly receive the feedback acknowledgement message sent by the access device, the UE continues to send the data packets in subsequent uplink contention resources, and repeats the first to third steps. It may be further defined that if specified maximum times that the UE attempts to transmit the data packets in uplink contention resources and the UE still does not succeed, the UE stops attempting and informs higher layers that a link is unreliable, and a correct transmission is impossible.

In the embodiments of the present disclosure, an applicable scene is that the UE needs to enter the connected state (indicated by the BSR). Specifically, the scene includes steps as follow.

First Step: sending, by the UE, the initial uplink transmission in uplink contention resources available in a region, wherein the initial uplink transmission includes: an inactive-state UE identifier of the UE for identifying an identity of the UE, such as the Inactive UE ID; a BSR report; data packets sent to the access device (optional).

Second Step: sending, by the access device, the feedback acknowledgement message, wherein the feedback acknowledgement message carries the identifier of the UE in the Inactive state (such as the Inactive UE ID), for acknowledging to the UE and solving contention; and/or the air-interface transmission unique identifier of the UE for performing data scheduling and data transmission of the UE after the UE enters the connected state. After the UE receives the feedback acknowledgement message carrying the air-interface transmission unique identifier of the UE, the air-interface transmission unique identifier of the UE comes into effect and the UE enters the connected state.

Third Step: sending the ACK feedback message by the UE in response to the feedback acknowledgement message from the access device. Resource positions of Hybrid Automatic Repeat reQuest (HARQ) feedbacks correspond to resource positions of the feedback acknowledgement message sent by the access device. The ACK sequence may be related to resources of the feedback acknowledgement message sent by the access device and/or the air-interface transmission unique identifier of the UE. Optionally, the access device schedules uplink transmission of the UE using the air-interface transmission unique identifier of the UE. If the UE sends uplink transmission according to subsequent uplink scheduling, then the UE finishes an acknowledge procedure simultaneously.

It should be noted that the third step is an optional step.

Further, after the UE sends the initial uplink transmission, the UE caches, in a cache, the data packets having been sent.

If the UE correctly receives the feedback acknowledgement message sent by the access device, the UE may empty the cache. If the UE fails to correctly receive the feedback acknowledgement message sent by the access device, the UE continues to send the data packets in subsequent uplink contention resources, and repeats the first to third steps. It may be further defined that if specified maximum times that the UE attempts to transmit the data packets in uplink contention resources and the UE still does not succeed, the UE stops attempting and informs higher layers that a link is unreliable, and a correct transmission is impossible.

Based on any one of the above embodiments, the method may further include configuring uplink contention resources. Specifically, the uplink contention resources in which the UE sends the initial uplink transmission are valid in a region. The region at least is a region in which the Inactive UE ID of the UE is valid, or may be a larger region.

The uplink contention resources may be divided into one or more groups. Configuration contents of each group of uplink contention resources may include one or more of the following: time-domain resource positions and frequency-domain resource positions of the uplink contention resources (compulsory); a scrambled sequence code CB-RNTI used in scheduling and data transmission of the uplink contention resources; types of UEs to which the uplink contention resources are available; capability level of UEs to which the uplink contention resources are applicable; service types of UEs to which the uplink contention resources are applicable.

The uplink contention resources may be configured by any one of the following: configured by a system broadcast; pre-configured by the UE; configured by a dedicated signaling of the access device when the UE is in the connected state and before the UE enters the Inactive state.

Based on any one of the above embodiments, the UE determines whether the UE is to enter the connected state. Specifically, uplink data of the UE arrives; the UE determines whether a traffic type of the uplink data is a traffic of burst small data packets or a continuous traffic; if the traffic type of the uplink data is the traffic of burst small data packets, the UE is not triggered to enter the connected state; if the traffic type of the uplink data is the continuous traffic, the UE is triggered to enter the connected state.

Optionally, the uplink data of the UE arrives; the UE determines an amount of the uplink data to be sent; if the amount of the uplink data is smaller than a predetermined threshold, the UE is not triggered to enter the connected state; if the amount of the uplink data is larger than the predetermined threshold, the UE is triggered to enter the connected state. The predetermined threshold may be specified in a Protocol or preconfigured by the UE, or informed to the UE by the network side device through a broadcast or a dedicated signaling.

Figure 6:
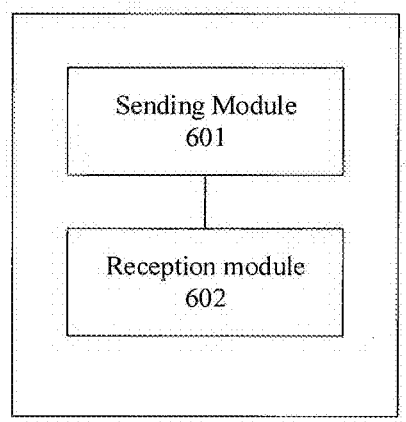
FIG. 6 is a schematic diagram of an access device according to some embodiments of the present disclosure.

Referring to FIG. 6, FIG. 6 shows a User Equipment (UE), the UE includes a sending module 601 and a reception module 602. The sending module 601 is configured to, in case that uplink data of the UE in the Inactive state arrives, send initial uplink transmission carrying an inactive-state UE identifier of the UE in uplink contention resources available in a region.

The uplink contention resources available in the region refer to resources reserved for uplink contention transmission by all access devices in the region. The region at least includes a region in which the inactive-state UE identifier (such as the Inactive UE ID) of the UE is valid, and may include a larger region.

The uplink contention resources may be available by all UEs, or may be available by a specific type of UEs, or UEs with a specific capability, or UEs transmitting a specific traffic, and the present disclosure is not limited thereto.

The uplink contention resources may be divided into one or more groups, wherein configuration contents for each group of uplink contention resources include one or more of the following: time-domain resource positions and frequency-domain resource positions of the uplink contention resources, scrambled sequence codes used in scheduling and data transmission of the uplink contention resources; types of UEs to which the uplink contention resources are available; capability levels of the UEs to which the uplink contention resources are applicable; and service types to which the uplink contention resources are applicable.

The uplink contention resources may be configured by any of the following: configured by a system message broadcast, per-configured by a UE; and configured by a dedicated signaling when the UE is in the connected state and before the UE enters the Inactive state.

Contents of the initial uplink transmission include one or more of the following: an inactive-state UE identifier of a UE; an identifier for whether the UE needs to enter the connected state; small data packets which the UE sends to an access device; and a Buffer Status Report (BSR), wherein contents of the BSR include an amount of cached data to be sent by the UE currently or the BSR is empty.

The reception module 602 is configured to receive a feedback acknowledgement message for acknowledging the initial uplink transmission.

If the UE needs to enter the connected state, the feedback acknowledgement message carries the inactive-state UE identifier of the UE and/or the air-interface transmission unique identifier of the UE. If the UE does not need to enter the connected state, the feedback acknowledgement message carries the inactive-state UE identifier of the UE.

Optionally, the UE further includes a caching module and an emptying module. The caching module is configured to cache uplink data packets having been sent in the initial uplink transmission after the UE sends the initial uplink transmission. The emptying module is configured to, in a case that the UE correctly receives the feedback acknowledgement message from the access device, empty the cached data packets. The sending module is further configured to, in a case that the UE does not correctly receive the feedback acknowledgement message from the access device, continue to send the cached data packets in subsequent uplink contention resources.

Optionally, the UE further includes an informing module. The informing module is configured to, in case that times that the UE attempts to send the cached data packets in uplink contention resources reach a specified maximum attempt number, but the UE still does not succeed, stop attempting to send the cached data packets and inform high layers of the UE that data transmission is failed.

Optionally, the UE further includes a feedback module. The feedback module is configured to, in case that the feedback acknowledgement message carries the inactive-state UE identifier of the UE, send an ACK feedback message by the UE in response to the feedback acknowledgement message from the access device. Resources positions of Hybrid Automatic Repeat reQuest (HARQ) feedbacks related to the ACK feedback message correspond to resource positions of the feedback acknowledgement message sent by the access device, an ACK sequence related to the ACK feedback message is related to resources of the feedback acknowledgement message from the access device and/or the air-interface transmission unique identifier of the UE; or the sending module is further configured to, in case that the feedback acknowledgement message carries the air-interface transmission unique identifier of the UE, send uplink transmission according to subsequent uplink scheduling, wherein the subsequent uplink scheduling refers to uplink scheduling for the UE performed by the access device according to the air-interface transmission unique identifier of the UE.

Optionally, the UE further includes a determination module. The determination module is configured to: determine a traffic type of the uplink data; if the traffic type of the uplink data is a traffic of burst small data packets, not trigger the UE to enter the connected state; if the traffic type of the uplink data is a continuous traffic, trigger the UE to enter the connected state; or the determination module is configured to: determine an amount of uplink data needing to be sent; if the amount of the uplink data is smaller than a predetermined threshold, not trigger the UE to enter the connected state; if the amount of the uplink data is larger than the predetermined threshold, trigger the UE to enter the connected state.

In case that uplink data of the UE in the Inactive state arrives, the UE sends the initial uplink transmission carrying the inactive-state UE identifier of the UE in the uplink contention resources available in the region, the UE receives the feedback acknowledgement message for acknowledging the initial uplink transmission. The solution in which the UE in the Inactive state performs uplink data transmission quickly is provided. Further, because the UE in the Inactive state may send the small data packets to the access device, signaling overhead generated by state transitions of the UE is avoided, and whether the UE needs the state transitions may be determined flexibly, thus further reducing unnecessary signaling overhead.

Figure 7:
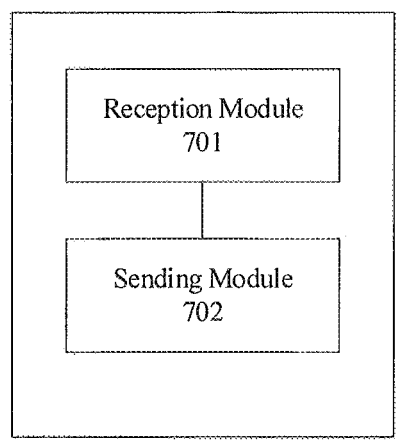
FIG. 7 is a schematic diagram of a User Equipment according to some embodiments of the present disclosure.

Referring to FIG. 7, FIG. 7 shows an access device. The access device includes a reception module 701 and a sending module 702. The reception module 701 is configured to receive an initial uplink transmission carrying an inactive-state UE identifier of a UE, wherein the initial uplink transmission is sent by the UE in uplink contention resources available in a region in case that uplink data of the UE in the Inactive state arrives. The uplink contention resources available in the region refer to resources reserved for uplink contention transmission by all access devices in the region. The region at least includes a region in which the inactive-state UE identifier (such as Inactive UE ID) of the UE is valid, and may include a larger region.

The uplink contention resources may be available by all UEs, and may be available by a specific type of UEs, or UEs with a specific capability, or UEs transmitting a specific traffic, and the present disclosure is not limited thereto.

The uplink contention resources may be grouped into one or more groups, wherein configuration contents for each group of uplink contention resources include one or more of the following: time-domain resource positions and frequency-domain resource positions of the uplink contention resources, scrambled sequence codes used in scheduling and data transmission and reception of the uplink contention resources; types of UEs to which the uplink contention resources are available; capability levels of the UEs to which the uplink contention resources are applicable; and service types to which the uplink contention resources are applicable.

The uplink contention resources may be configured by any of the following: configured by a system message broadcast, per-configured by a UE; and configured by a dedicated signaling when the UE is in the connected state and before the UE enters the Inactive state.

Contents of the initial uplink transmission include one or more of the following: an inactive-state UE identifier of a UE; an identifier indicating whether the UE needs to enter the connected state; small packets which the UE sends to an access device; and a Buffer Status Report (BSR), wherein contents of the BSR include an amount of cached data to be sent by the UE currently or the BSR is empty.

The sending module 702 is configured to send a feedback acknowledgement message for acknowledging the initial uplink transmission.

If the UE needs to enter the connected state, the feedback acknowledgement message carries the inactive-state UE identifier of the UE and/or the air-interface transmission unique identifier of the UE; if the UE does not need to enter the connected state, the feedback acknowledgement message carries the inactive-state UE identifier of the UE.

Optionally, the reception module is further configured to, in case that the feedback acknowledgement message carries the inactive-state UE identifier of the UE, receive an ACK feedback message sent by the UE in response to the feedback acknowledgement message, wherein Hybrid Automatic Repeat reQuest (HARQ) feedback resource positions related to the ACK feedback message correspond to resource positions of the feedback acknowledgement message sent by the access device, an ACK sequence related to the ACK feedback message is related to resources of the feedback acknowledgement message from the access device and/or the air-interface transmission unique identifier of the UE.

Optionally, the access device further includes a scheduling module. The scheduling module is configured to, in case that the feedback acknowledgement message carries the air-interface transmission unique identifier of the UE, schedule uplink transmission of the UE according to the air-interface transmission unique identifier of the UE.

Optionally, the access device further includes a determination module. The determination module is configured to determine whether the UE needs to enter the connected state; in case that the initial uplink transmission received by the reception module includes an identifier identifying that the UE is to enter the connected state, and the identifier indicates that the UE needs to enter the connected state, determine that the UE needs to enter the connected state; or in case that the initial uplink transmission received by the reception module includes the Buffer Status Report (BSR) which indicates an amount of cached data to be sent by the UE, and the amount of cached data is not zero, determine that the UE needs to enter the connected state.

In case that uplink data of the UE in the Inactive state arrives, the UE sends the initial uplink transmission carrying the inactive-state UE identifier of the UE in the uplink contention resources available in the region, the UE receives the feedback acknowledgement message for acknowledging the initial uplink transmission. A solution in which the UE in the Inactive state performs the uplink data transmission quickly. Furthermore, because the UE in the Inactive state may send the small data packets to the access device, signaling overhead generated by state transitions of the UE is avoided, and whether the UE needs the state transitions may be determined flexibly, thus further reducing unnecessary signaling overhead.

Figure 8:
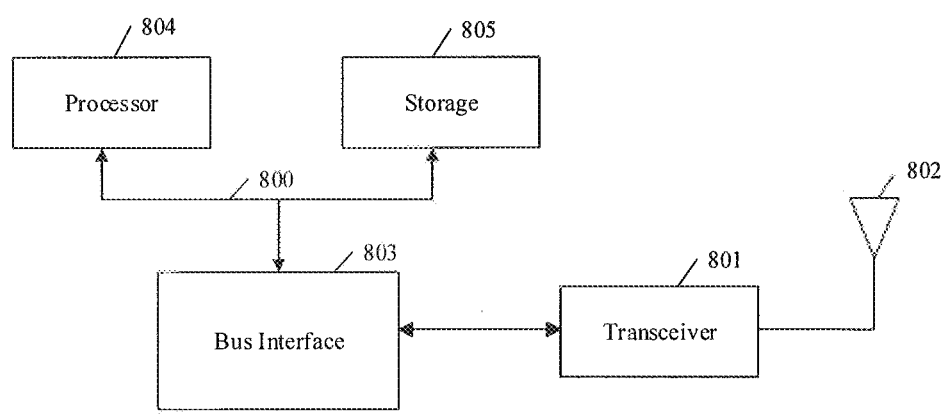
FIG. 8 is a schematic diagram of the access device according to some embodiments of the present disclosure.

Referring to FIG. 8, FIG. 8 shows a User Equipment (UE). The UE includes a processor 804, a storage 805, and a transceiver 801.

The storage 805 is configured to store programs and data used by the processor 804 when the processor 804 performs operations.

The processor 804 is configured to read the programs in the storage 805 to perform the following steps: in case that uplink data of the UE in the Inactive state arrives, sending initial uplink transmission carrying an inactive-state UE identifier of the UE in uplink contention resources available in a region; and receive a feedback acknowledgement message for acknowledging the initial uplink transmission.

The transceiver 801 is configured to transmit data and receive data under a control of the processor 804.

In FIG. 8, a bus intra-structure is represented by a bus 800. The bus may include any number of buses and bridges connected together. Specifically, a plurality of processors such as the processor 804 and a plurality of storages such as the storage 805 are connected together by the bus 800. The bus 800 may also cause various other circuits such as a peripheral circuit, a voltage regulator and a power management circuit to be connected together. The circuits are known in the art, and thus detailed description thereof is not further provided herein. A bus interface 803 provides an interface between the bus 800 and the transceiver 801. The transceiver 801 may include one or more elements such as receivers and transmitters for communicating with other devices through a transmission medium. Data processed by the processor 804 is transmitted through a wireless medium by an antenna 802. Furthermore, the antenna 802 further receives data and transmits the data to the processor 804.

The processor 804 takes charge of management of the bus 800 and general processing, as well as other functions including timing, peripheral interfaces, voltage regulations, power managements and other control functions. The storage 805 is configured to store programs and data used by the processor 804 when the processor 804 performs operations.

Optionally, the processor 804 may be a Central Processing Unit (CPU), an Application Specific Integrated Circuit (ASIC), a field programmable gate array (FPGA) or a Complex Programmable Logic Device (CPLD).

The uplink contention resources available in the region refer to resources reserved for uplink contention transmission by all access devices in the region. The region at least includes a region in which the identifier (such as Inactive UE ID) of the UE in the inactive state is valid, and may include a larger region.

The uplink contention resources may be available by all UEs, or may be available by a specific type of UEs, or UEs with a specific capability, or UEs transmitting a specific traffic, and the present disclosure is not limited thereto.

The uplink contention resources may be grouped into one or more groups, wherein configuration contents for each group of uplink contention resources include one or more of the following: time-domain resource positions and frequency-domain resource positions of the uplink contention resources, scrambled sequence codes used in scheduling and data transmission of the uplink contention resources; types of UEs to which the uplink contention resources are available; capability levels of the UEs to which the uplink contention resources are applicable; and service types to which the uplink contention resources are applicable.

The uplink contention resources may be configured by any of the following: configured by a system message broadcast, per-configured by a UE; and configured by a dedicated signaling when the UE is in the connected state and before the UE enters the Inactive state.

Contents of the initial uplink transmission include one or more of the following: an inactive-state UE identifier of a UE; an identifier indicating whether the UE needs to enter the connected state; small data packets which the UE sends to an access device; and the Buffer Status Report (BSR), wherein contents of the BSR include an amount of cached data to be sent by the UE currently or the BSR is empty.

If the UE needs to enter the connected state, the feedback acknowledgement message carries the inactive-state UE identifier of a UE and/or the air-interface transmission unique identifier of the UE. If the UE does not need to enter the connected state, the feedback acknowledgement message carries the inactive-state UE identifier of the UE.

Optionally, the processor 804 is further configured to, after the UE sends the initial uplink transmission, cache uplink data packets having been sent in the initial uplink transmission; in a case that the UE correctly receives the feedback acknowledgement message from the access device, empty the cached data packets.

The processor 804 is further configured to, in a case that the UE does not correctly receive the feedback acknowledgement message from the access device, continue to send the cached data packets in subsequent uplink contention resources.

Optionally, the processor 804 is further configured to, in case that times that the UE attempts to send the cached data packets in the uplink contention resources reach a specified maximum attempt number, but the UE still does not succeed, stop attempting to send the cached data packets and inform high layers of the UE that data transmission is failed.

Optionally, the processor 804 is further configured to, in case that the feedback acknowledgement message carries the inactive-state UE identifier of the UE, send an ACK feedback message by the UE in response to the feedback acknowledgement message from the access device, wherein Hybrid Automatic Repeat reQuest (HARQ) feedback resource positions related to the ACK feedback message correspond to resource positions of the feedback acknowledgement message sent by the access device, an ACK sequence related to the ACK feedback message is related to resources of the feedback acknowledgement message from the access device and/or the air-interface transmission unique identifier of the UE. Optionally, the processor 804 is further configured to, in case that the feedback acknowledgement message carries the air-interface transmission unique identifier of the UE, send uplink transmission according to subsequent uplink scheduling, wherein the subsequent uplink scheduling refers to uplink scheduling for the UE performed by the access device according to the air-interface transmission unique identifier of the UE.

Optionally, the processor 804 is further configured to, determine a traffic type of the uplink data; if the traffic type of the uplink data is a traffic of burst small data packets, not trigger the UE to enter the connected state; if the traffic type of the uplink data is a continuous traffic, trigger the UE to enter the connected state. Optionally, the processor 804 is further configured to determine an amount of uplink data needing to be sent; if the amount of the uplink data is smaller than a predetermined threshold, not trigger the UE to enter the connected state; if the amount of the uplink data is larger than the predetermined threshold, trigger the UE to enter the connected state.

In case that uplink data of the UE in the Inactive state arrives, the UE sends the initial uplink transmission carrying the inactive-state UE identifier of the UE in the uplink contention resources available in the region, the UE receives the feedback acknowledgement message for acknowledging the initial uplink transmission. A solution in which the UE in the Inactive state performs the uplink data transmission quickly is provided. Because the UE in the Inactive state may send the small data packets to the access device, signaling overhead generated by state transitions of the UE is avoided, and whether the UE needs the state transitions may be determined flexibly, thus further reducing unnecessary signaling overhead.

Figure 9:
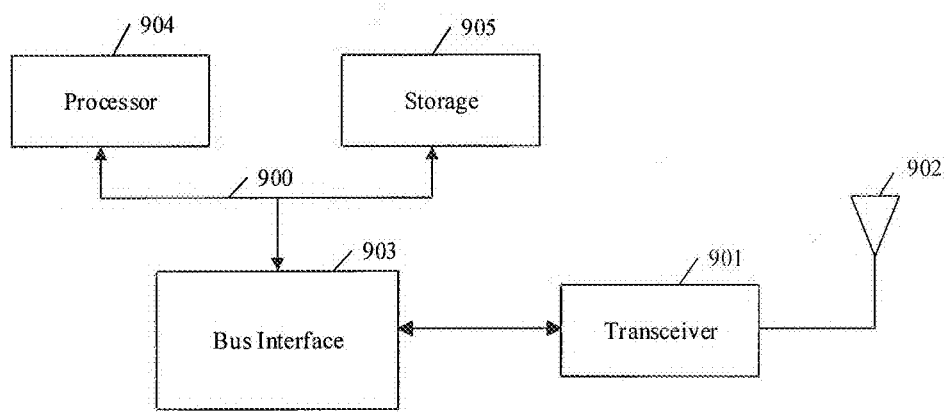
FIG. 9 is a schematic diagram of the User Equipment according to some embodiments of the present disclosure.

Referring to FIG. 9, FIG. 9 shows a User Equipment (UE). The UE includes a processor 904, a storage 905 and a transceiver 901.

The storage 905 is configured to store programs and data used by the processor 904 when the processor 904 performs operations.

The processor 904 is configured to read the programs in the storage 905 to perform the following steps: receiving an initial uplink transmission carrying an inactive-state UE identifier of the UE, wherein the initial uplink transmission is sent by the UE in uplink contention resources available in a region in case that uplink data of the UE in the Inactive state arrives; and sending a feedback acknowledgement message for acknowledging the initial uplink transmission.

The transceiver 901 is configured to transmit data and receive data under a control of the processor 904.

In FIG. 9, a bus intra-structure is represented by a bus 900. The bus 900 may include any number of buses and bridges connected together. Specifically, a plurality of processors such as the processor 904 and a plurality of storages such as the storage 905 are connected together by the bus 900. The bus 900 may also cause any other circuits such as a peripheral device, a voltage regulator and a power management circuit to be connected together. The circuits are known in the art, and thus detailed descriptions thereof are not further provided herein. A bus interface 903 provides an interface between the bus 900 and the transceiver 901. The transceiver 901 may include one or more elements such as a plurality of receivers and a plurality of transmitters for communicating with other devices through a transmission medium. Data processed by the processor 904 is transmitted through a wireless medium by an antenna 902. Furthermore, the antenna 902 further receives data and transmits the data to the processor 904.

The processor 904 takes charge of management of the bus 900 and general processing, as well as other functions including timing, peripheral interfaces, voltage regulations, power managements and other control functions. The storage 905 is configured to store programs and data used by the processor 904 when the processor 804 performs operations.

Optionally, the processor 904 may be a Central Processing Unit (CPU), an Application Specific Integrated Circuit (ASIC), a Field Programmable Gate Array (FPGA) or a Complex Programmable Logic Device (CPLD).

The uplink contention resources may be available by all UEs, or may also be available by a specific type of UEs, or UEs with a specific capability, or UEs transmitting a specific traffic, and the present disclosure is not limited thereto.

The uplink contention resources may be grouped into one or more groups, wherein configuration contents for each group of uplink contention resources include one or more of the following: time-domain resource positions and frequency-domain resource positions of the uplink contention resources, scrambled sequence codes used in scheduling and data transmission of the uplink contention resources; types of UEs to which the uplink contention resources are available; capability levels of the UEs to which the uplink contention resources are applicable; and service types to which the uplink contention resources are applicable.

The uplink contention resources may be configured by any of the following: configured by a system message broadcast, per-configured by a UE; and configured by a dedicated signaling when the UE is in the connected state and before the UE enters the Inactive state.

Contents of the initial uplink transmission include one or more of the following: the inactive-state UE identifier of the UE; an identifier indicating whether the UE needs to enter the connected state; small packets which the UE sends to an access device; and a Buffer Status Report (BSR), wherein contents of the BSR include an amount of cached data to be sent by the UE currently or the BSR is empty.

Optionally, the processor 904 is further configured to, in case that the feedback acknowledgement message carries the inactive-state UE identifier of the UE, send an ACK feedback message in response to the feedback acknowledgement message from the access device, wherein Hybrid Automatic Repeat reQuest (HARQ) feedback resource positions related to the ACK feedback message correspond to resource positions of the feedback acknowledgement message sent by the access device, an ACK sequence related to the ACK feedback message is related to resources of the feedback acknowledgement message from the access device and/or the air-interface transmission unique identifier of the UE.

Optionally, the processor 904 is further configured to, in case that the feedback acknowledgement message carries the air-interface transmission unique identifier of the UE, send uplink transmission according to subsequent uplink scheduling.

Optionally, the processor 904 is further configured to

Optionally, the processor 904 is further configured to determine whether the UE needs to enter the connected state; in case that the initial uplink transmission received by the access device includes an identifier identifying that the UE is to enter the connected state, and the identifier indicates that the UE needs to enter the connected state, determine that the UE needs to enter the connected state; or in case that the initial uplink transmission received by the access device includes the Buffer Status Report (BSR) which indicates an amount of cached data to be sent by the UE, and the amount of cached data is not zero, determine that the UE needs to enter the connected state.

In case that uplink data of the UE in the Inactive state arrives, the UE sends the initial uplink transmission carrying the inactive-state UE identifier of the UE in the uplink contention resources available in the region, the UE receives the feedback acknowledgement message for acknowledging the initial uplink transmission. A solution in which the UE in the Inactive state performs the uplink data transmission quickly. Furthermore, because the UE in the Inactive state may send the small data packets to the access device, signaling overhead generated by state transitions of the UE is avoided, and whether the UE needs the state transitions may be determined flexibly, thus further reducing unnecessary signaling overhead.

It should be understood that "an embodiment" or "one embodiment" mentioned throughout the specification of the present disclosure means that specific features, structures or characteristics related to the embodiment are included in at least one embodiment of the present disclosure. Therefore, "in an embodiment" or "in one embodiment" appearing throughout the specification of the present application does not necessarily mean an identical embodiment. Additionally, the specific features, structures or characteristics may be combined in one or more embodiments in any suitable combination.

In the embodiments of the present disclosure, it should be understood that sequential numbers in methods of the present disclosure do not represent a sequential order for performing the methods. An order for performing the methods should be determined according to inherent functional or logical sequences of the methods, and should not limit ways in which the methods are executed in the embodiments of the present disclosure.

Additionally, terms such as "system" and "network" in the present disclosure may be used interchangeably.

It should be understood that a term "and/or" in the present disclosure only represents an interrelated relation of described objects, and may represent three relations of the objects. For example, A and/or B may represent three cases that only A exists, A and B concurrently exist, or only B exists. Additionally, a symbol "/" in the present disclosure generally represent objects before and after the symbol have a relation "or" between them.

In the embodiments of the present disclosure, it should be understood that 'B corresponding to A' represents that B is related to A, and B may be determined according to A. It should be further understood that, 'B may be determined according to A' does not mean that the B is determined only according to the A, and the B may also be determined according to the A and/or other factors.

It should be understood that, in the several embodiments provided in the present disclosure, the disclosed device and method can be implemented in other ways. The apparatus embodiments described above are only illustrative. For example, a division of a unit may be only a logically functional division. There may be other divisions in actual implementations, e.g, multiple units or components can be combined or integrated in another system, or some features may be omitted or not executed. Additionally, couplings, or direct couplings, or communication connections between displayed or discussed components may be indirect couplings or communication connections via some interfaces, devices or units, may be electrical, mechanical or other forms of connections.

The functional units described in the embodiments of the present disclosure may be integrated in one processing unit or may be separated physically, or two or more of the units may be integrated in one unit. The above integrated units may be implemented by hardware, or a functional unit including hardware and software.

The above integrated units implemented by the functional unit including software may be stored in a computer readable storage medium. The functional units including software stored the medium may include instructions for causing a computing device (which may be a personal computer, a server, a network device or the like) to perform a part of the methods of the embodiments of the present disclosure. The storage medium may include mediums capable of storing programs and codes, such as a USB disk, a removable disk, a Read Only Memory (ROM), a Random Access Memory (RAM), a Magnetic Disk, a Compact Disk, or the like.

The above described embodiments of the present disclosure are optional embodiments. It should be noted that numerous modification and embellishment may be made by one of ordinary skills in the art without departing from the spirit of the present disclosure, and such modification and embellishment also fall within the scope of the present disclosure.

What is claimed is:

1. A method for transmitting uplink data, comprising:
   sending, by a User Equipment (UE), an initial uplink transmission carrying an inactive-state UE identifier of the UE in uplink contention resources available in a region, in case that uplink data of the UE in an inactive state arrives, wherein the inactive state is a state of the UE not establishing a connection with a cell; and
   receiving a feedback acknowledgement message for acknowledging the initial uplink transmission,
   wherein the method further comprises:
   determining a traffic type of the uplink data by the UE, and not triggering the UE to enter a connected state in case that the traffic type of the uplink data is a traffic of burst small data packets, or triggering the UE to enter the connected state in case that the traffic type of the uplink data is a continuous traffic; or
   determining, by the UE, an amount of the uplink data needing to be sent, and not triggering the UE to enter the connected state in case that the amount of the uplink data is smaller than a predetermined threshold, or triggering the UE to enter the connected state in case that the amount of the uplink data is larger than the predetermined threshold.

2. The method according to claim 1, wherein, the region at least comprises a region in which the inactive-state UE identifier of the UE is valid;
   the uplink contention resources are grouped into one or more groups, configuration contents for each group of uplink contention resources comprise one or more of:
   time-domain resource positions and frequency-domain resource positions of the uplink contention resources,
   scrambled sequence codes used in scheduling and data transmission of the uplink contention resources,
   types of UEs to which the uplink contention resources are available,
   capability levels of UEs to which the uplink contention resources are applicable, and
   service types to which the uplink contention resources are applicable; and
   the uplink contention resources are configured by a system message broadcast, or per-configured by the UE, or configured by a dedicated signaling when the UE is in a connected state and before the UE enters the inactive state; and/or
   contents of the initial uplink transmission comprise one or more of:
   the inactive-state UE identifier of the UE;
   an identifier indicating whether the UE is to enter a connected state;
   small data packets sent to an access device by the UE; and
   a Buffer Status Report (BSR), wherein contents of the BSR are an amount of cached data to be sent currently by the UE, or the BSR is empty.

3. The method according to claim 1, wherein, in case that the UE needs to enter a connected state, the feedback acknowledgement message carries the inactive-state UE identifier of the UE and/or an air-interface transmission unique identifier of the UE; and in case that the UE does not need to enter the connected state, the feedback acknowledgement message carries the inactive-state UE identifier of the UE.

4. The method according to claim 1, wherein after sending the initial uplink transmission by the UE, the method further comprises: caching, by the UE, data packets having been sent in the initial uplink transmission;

after receiving, by the UE, the feedback acknowledgement message for acknowledging the initial uplink transmission, the method further comprises:

in case that the UE correctly receives the feedback acknowledgement message from an access device, emptying the cached data packets by the UE;

in case that the UE does not correctly receive the feedback acknowledgement message from the access device, continuing to send the cached data packets in subsequent uplink contention resources by the UE.

5. The method according to claim 1, wherein after receiving, by the UE, the feedback acknowledgement message sent by an access device for acknowledging the initial uplink transmission, the method further comprises:

sending an ACK feedback message by the UE in response to the feedback acknowledgement message sent by the access device, in case that the feedback acknowledgement message carries the inactive-state UE identifier of the UE, wherein Hybrid Automatic Repeat reQuest (HARQ) feedback resource positions related to the ACK feedback message correspond to resource positions of the feedback acknowledgement message sent by the access device, an ACK sequence related to the ACK feedback message is related to resources of the feedback acknowledgement message from the access device and/or an air-interface transmission unique identifier of the UE; or sending uplink transmission by the UE according to subsequent uplink scheduling in case that the feedback acknowledgement message carries the air-interface transmission unique identifier of the UE, wherein the subsequent uplink scheduling is performed by the access device for the UE according to the air-interface transmission unique identifier of the UE.

6. A User Equipment (UE), comprising:
a processor, a storage and a transceiver,
wherein the storage is configured to store programs and data used by the processor when the processor performs operations;
the processor is configured to control the transceiver to transmit and receive data;
the transceiver is configured to perform the method according to claim 1, under a control of the processor.

7. A User Equipment (UE), comprising:
a sending circuit configured to, in case that uplink data of the UE in an inactive state arrives, send an initial uplink transmission carrying an inactive-state UE identifier of the UE in uplink contention resources available in a region, wherein the inactive state is a state of the UE not establishing a connection with a cell;
a reception circuit configured to receive a feedback acknowledgement message for acknowledging the initial uplink transmission, and
a determination circuit, wherein the determination circuit is configured to determine a traffic type of the uplink data; and not trigger the UE to enter a connected state in case that the traffic type of the uplink data is a traffic of burst small data packets, or trigger the UE to enter the connected state in case that the traffic type of the uplink data is a continuous traffic; or the determination circuit is configured to determine an amount of the uplink data needing to be sent not trigger the UE to enter the connected state in case that the amount of the uplink data is smaller than a predetermined threshold, or trigger the UE to enter the connected state in case that the amount of the uplink data is larger than the predetermined threshold.

8. The UE according to claim 7, wherein,
the region at least comprises a region in which the inactive-state UE identifier of the UE is valid;
configuration contents for each group of uplink contention resources comprise one or more of:
time-domain resource positions and frequency-domain resource positions of the uplink contention resources,
scrambled sequence codes used in scheduling and data transmission of the uplink contention resources,
types of UEs to which the uplink contention resources are available,
capability levels of UEs to which the uplink contention resources are applicable, and
service types to which the uplink contention resources are applicable;
the uplink contention resources are be configured by a system message broadcast, or per-configured by the UE, or configured by a dedicated signaling when the UE is in a connected state and before the UE enters the inactive state; and/or
contents of the initial uplink transmission comprise one or more of:
the inactive-state UE identifier of the UE,
an identifier indicating whether the UE is to enter a connected state;
small data packets sent to an access device by the UE;
a Buffer Status Report (BSR), wherein contents of the BSR is an amount of cached data to be sent currently by the UE, or the BSR is empty.

9. The UE according to claim 7, wherein,
in case that the UE needs to enter a connected state, the feedback acknowledgement message carries the inactive-state UE identifier and/or an air-interface transmission unique identifier of the UE;
in case that the UE does not need to enter the connected state, the feedback acknowledgement message carries the inactive-state UE identifier of the UE.

10. The UE according to claim 7, further comprising:
a caching circuit configured to, after the UE sends the initial uplink transmission, cache data packets having been sent in the initial uplink transmission;
an emptying circuit configured to, in case that the UE correctly receives the feedback acknowledgement message from the access device, empty the cached data packets;
the sending circuit is further configured to, in case that the UE does not correctly receive the feedback acknowledgement message from the access device, continue to send the cached data packets in subsequent uplink contention resources.

11. The UE according to claim 10, further comprising:
an informing circuit configured to, in case that times that the UE attempts to send the cached data packets in the uplink contention resources reach a specified maximum attempt number, but the UE does not succeed, stop attempting to send the cached data packets, and inform high layers of the UE that data transmission is failed.

12. The UE according to claim 7, further comprising:
a feedback circuit configured to, in case that the feedback acknowledgement message carries the inactive-state UE identifier of the UE, send an ACK feedback message in response to the feedback acknowledgement message from the access device;
wherein Hybrid Automatic Repeat reQuest (HARQ) feedback resource positions related to the ACK feedback message correspond to resource positions of the feedback acknowledgement message sent by the access device, an ACK sequence related to the ACK feedback message is related to resources of the feedback acknowledgement message from the access device and/or an air-interface transmission unique identifier of the UE; or
the sending circuit is further configured to, in case that the feedback acknowledgement message carries the air-interface transmission unique identifier of the UE, send the uplink transmission according to subsequent uplink scheduling, wherein the subsequent uplink scheduling is performed by the access device for the UE according to the air-interface transmission unique identifier of the UE.

\* \* \* \* \*